(12) United States Patent
Wang

(10) Patent No.: US 9,267,198 B2
(45) Date of Patent: Feb. 23, 2016

(54) FORMING REACTIVE ELEMENT MODIFIED ALUMINIDE COATINGS WITH LOW REACTIVE ELEMENT CONTENT USING VAPOR PHASE TECHNIQUES

(75) Inventor: YongQing Wang, Plymouth, MN (US)

(73) Assignee: SIFCO Industries, Inc., Cleveland, OH (US)

( * ) Notice: Subject to any disclaimer, the term of this patent is extended or adjusted under 35 U.S.C. 154(b) by 0 days.

(21) Appl. No.: 13/321,409

(22) PCT Filed: May 13, 2010

(86) PCT No.: PCT/US2010/034712
§ 371 (c)(1),
(2), (4) Date: May 7, 2012

(87) PCT Pub. No.: WO2010/135144
PCT Pub. Date: Nov. 25, 2010

(65) Prior Publication Data
US 2012/0213928 A1   Aug. 23, 2012

Related U.S. Application Data

(60) Provisional application No. 61/216,496, filed on May 18, 2009.

(51) Int. Cl.
*C23C 16/00* (2006.01)
*C23C 10/14* (2006.01)
*C23C 10/06* (2006.01)

(52) U.S. Cl.
CPC .............. *C23C 10/14* (2013.01); *C23C 10/06* (2013.01); *Y02T 50/67* (2013.01)

(58) Field of Classification Search
CPC ........ C23C 10/00; C23C 10/04; C23C 10/14; C23C 10/28; C23C 10/52; C23C 28/32; C23C 28/30
USPC ............................................. 427/250, 248.1
See application file for complete search history.

(56) References Cited

U.S. PATENT DOCUMENTS 3,486,927 A   12/1969 Gauje
3,598,638 A   8/1971 Levine
(Continued)

FOREIGN PATENT DOCUMENTS

EP   0 821 078   1/1998
EP   1 329 536   7/2003

OTHER PUBLICATIONS

Pint et al., "Effect of quaternary additions on the oxidation behavior of Hf-doped NiAl," *Oxidation of Metals*, vol. 59, pp. 257-283, 2003.
(Continued)

*Primary Examiner* — Kelly M Gambetta
(74) *Attorney, Agent, or Firm* — Benesch, Friedlander, Coplan & Aronoff, LLP

(57) ABSTRACT

Vapor phase coating techniques with improved control over the co-transfer and co-deposition of aluminum and reactive element(s) from sources to the article being coated. One method includes providing a reactive element source, wherein at least a portion of the reactive element source comprises a non-halide compound of a reactive element, providing an aluminum source, providing a halide activator, and heating an article having a metallic surface, the reactive element source, the aluminum source, and the halide activator under conditions effective to cause species comprising aluminum and the reactive element to be co-deposited onto said surface to form a coating.

18 Claims, 14 Drawing Sheets

(56) References Cited

U.S. PATENT DOCUMENTS

| | | | |
|---|---|---|---|
| 3,951,642 A * | 4/1976 | Chang et al. | 75/255 |
| 3,961,910 A | 6/1976 | Baladjanian et al. | |
| 3,993,454 A | 11/1976 | Giggins, Jr. et al. | |
| 3,996,021 A | 12/1976 | Chang et al. | |
| 4,585,481 A | 4/1986 | Gupta et al. | |
| 4,835,011 A * | 5/1989 | Olson et al. | 427/253 |
| 5,000,782 A * | 3/1991 | Olson et al. | 75/253 |
| 5,817,371 A | 10/1998 | Gupta et al. | |
| 5,897,966 A | 4/1999 | Grossklaus, Jr. et al. | |
| 5,989,733 A | 11/1999 | Warnes et al. | |
| 6,020,075 A | 2/2000 | Gupta et al. | |
| 6,136,451 A | 10/2000 | Warnes et al. | |
| 6,146,696 A | 11/2000 | Das et al. | |
| 6,174,448 B1 | 1/2001 | Das et al. | |
| 6,332,931 B1 * | 12/2001 | Das et al. | 148/240 |
| 6,514,629 B1 | 2/2003 | Rigney et al. | |
| 6,582,772 B2 | 6/2003 | Rigney et al. | |
| 6,602,356 B1 | 8/2003 | Nagaraj et al. | |
| 6,682,827 B2 | 1/2004 | Darolia et al. | |
| 6,689,422 B1 | 2/2004 | Warnes et al. | |
| 6,863,925 B1 | 3/2005 | Wheat et al. | |
| 6,933,062 B2 | 8/2005 | Nagaraj et al. | |
| 7,214,409 B1 | 5/2007 | Kasule | |
| 7,250,225 B2 | 7/2007 | Hazel et al. | |
| 7,273,662 B2 | 9/2007 | Gleeson et al. | |
| 2002/0023696 A1 * | 2/2002 | Jaslier et al. | 148/285 |
| 2011/0151239 A1 * | 6/2011 | Lane et al. | 428/312.8 |

OTHER PUBLICATIONS

Tolpygo et al., "Effect of Hf, Y and C in the underlying superalloy on the rumpling of diffusion aluminide coatings," *Acta Materialia 56*, pp. 489-499, 2008.

Provenzano et al., "Void formation and suppression during high temperature oxidation of MCrAlY-type coatings," Surface and Coatings Technology, 36, Pages 61-74, 1988.

* cited by examiner

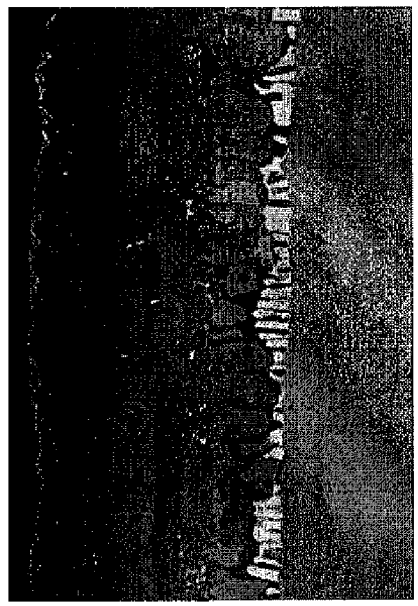
Fig. 4A  10μm
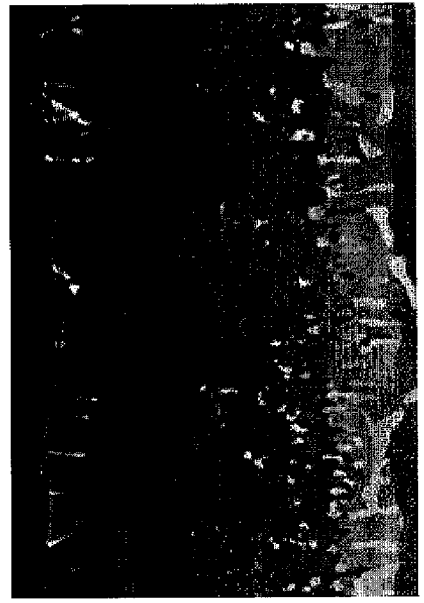
Fig. 4B  10μm
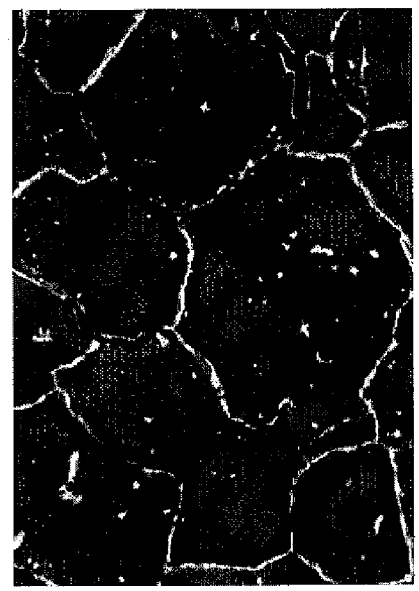
Fig. 4C  10μm
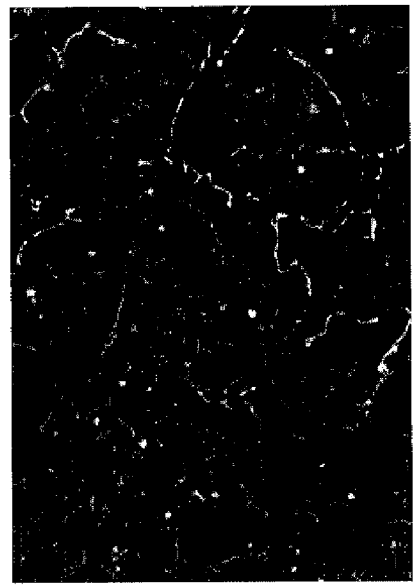
Fig. 4D  10μm

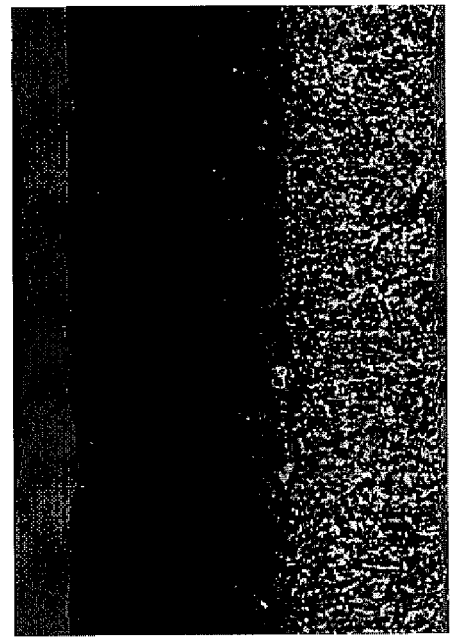
Fig. 9A
Fig. 9B
Fig. 9C
Fig. 9D

FORMING REACTIVE ELEMENT MODIFIED ALUMINIDE COATINGS WITH LOW REACTIVE ELEMENT CONTENT USING VAPOR PHASE TECHNIQUES

CROSS-REFERENCE TO RELATED APPLICATION

This application claims the benefit from International Application No. PCT/US2010/034712, filed May 13, 2010, having International Publication No. WO 2010/135144, which in turn claims priority to U.S. Provisional application No. 61/216,496 filed May 18, 2009, entitled "Forming Reactive Element Modified Aluminide Coatings with Low Reactive Element Content Using Vapor Phase Techniques", which applications are incorporated herein by reference in their entireties for all purposes.

FIELD OF THE INVENTION

The present invention relates to methods for using vapor phase coating techniques to form aluminide coatings with low content of reactive elements such as hafnium (Hf), zirconium (Zr), yttrium (Y), lanthanum (La), cerium (Ce), combinations of these, and the like. More specifically, the present invention uses vapor phase coating techniques to form such coatings wherein at least a portion of the reactive element source material includes a nonhalide compound of the reactive element(s) such as an oxide of the reactive element (e.g., $HfO_2$ in the case of Hf), a nitride of the reactive element (e.g., HfN in the case of Hf), and/or a carbide of the reactive element (e.g., HfC in the case of Hf). The coating synthesized with this process may be used to protect components against corrosion in high temperature environments. The coatings also may be used as a bond coat in a thermal barrier system for components used in high temperature environments.

BACKGROUND OF THE INVENTION

The drive to improve engine combustion efficiency and reducing emissions has resulted in a significant increase of the Turbine Entry Temperatures (TET) within gas-turbine engines since 1940s. Presently, the high-pressure turbine blades and vanes exposed to hot gases in commercial aeronautical engines typically experience metal surface temperatures of about 1000° C., with short-term peaks as high as 1100° C. In this service environment, significant advances in high temperature capabilities have been achieved through the development of iron, nickel and cobalt-base superalloys and the use of oxidation-resistant environmental coatings capable of protecting the superalloys from oxidation, hot corrosion, etc.

For instance, the surfaces of the articles to be protected can be protected with an aluminum-containing protective coating whose surface oxidizes to form an aluminum oxide scale that inhibits further oxidation. The protective coating therefore is sufficiently rich in Al to promote thermal growth of this oxide scale. The scale is also referred to as a thermally grown oxide (TGO). Optionally, a ceramic topcoat is further applied over the aluminum-containing protective layer to help provide a thermal barrier that extends service life. In addition to imparting oxidation resistance, the TGO helps bond the ceramic topcoat to the protective coating. Together, the protective coating (also referred to as a bond coat), the TGO layer, and the ceramic topcoat provide a Thermal Barrier Coating System (TBC) to protect the coated article.

Notwithstanding the protection provided by the thermal barrier coating system, the spallation and cracking of the thickening TGO scale layer often is the ultimate failure mechanism of conventional thermal barrier systems. Thus, improving the adhesion and integrity of the interfacial TGO scale is critical to the development of more reliable thermal barrier systems. Ideally, when exposed to high temperatures, the aluminum-containing protective coating should oxidize to form a slow-growing, non- or less "rumpling," nonporous TGO layer that adhere well to the protective coating and the ceramic topcoat.

A conventional bond coat is typically either an MCrAlY overlay (where M is Ni, Co, Fe, or combination of them) or a diffusion aluminide coating. An MCrAlY overlay is generally applied by Electron Beam Physical Vapor Deposition (EB-PVD), High Velocity Oxy-Fuel (HVOF), Low Pressure Plasma Spray (LPPS) or Vacuum Plasma Spray (VPS). Diffusion aluminide coatings are generally formed by chemical vapor deposition (CVD), slurry coating, or by a diffusion process such as pack cementation, above-pack, or vapor (gas) phase deposition. Diffusion aluminide coatings have particularly found widespread use as protective coatings for superalloy components of gas turbine engines due to: (1) the diffusion process is not a line-of-sight process allowing components with complex geometry or with internal surfaces to be coated; and (2) the diffusion process is generally cost-effective as compared with overlay process.

Reactive elements have been incorporated into aluminide coatings to improve the oxidation protection provided by these coatings. Examples of reactive elements that have been proposed for aluminide compositions include Hf, Zr, Y, La and/or Ce. With small additions of reactive elements to aluminide coatings, the adherence of the protective oxide scale to the coatings/alloys and the oxidation resistance of the coatings/alloys at high temperature under aggressive atmospheres can be improved.

The significant improvement of oxidation resistance due to Hf addition has been indicated in many cases, such as Hf addition to β-NiAl cast alloys (Pint et al., "Effect of quaternary additions on the oxidation behavior of Hf-doped NiAl," *Oxidation of Metals*, Vol. 59, Pages 257-283, 2003), and Hf addition to MCrAlY coatings materials (Giggins Jr., et al., U.S. Pat. No. 3,993,454, and Gupta et al., U.S. Pat. No. 4,585,481). In addition, Hf addition has also been proved that hafnium decreases the propensity for rumpling when it diffuses into the coating and to the growing aluminum oxide increasing their creep resistance (Tolpygo et al., "Effect of Hf, Y and C in the underlying superalloy on the rumpling of diffusion aluminide coatings," *Acta Materialia* 56, Pages 489-499, 2008) as well as decreases the voids formed in the coating alloy at the metal-oxide interface during oxidation (Provenzano et al., "Void formation and suppression during high temperature oxidation of MCrAlY-type coatings," Surface and Coatings Technology, 36, Pages 61-74, 1988).

Recently, U.S. Pat. No. 7,273,662 to Gleeson et al. taught two-phase γ-Ni+γ' $Ni_3Al$ alloy compositions with a purpose of reducing the progressive roughening or "rumpling" of the bond coat surface during thermal exposure. Due to the significant beneficial effect of Hf addition, diffusion coating processes to incorporate Hf into diffusion aluminide coatings have been studied for several decades. As early as the 1970s, U.S. Pat. Nos. 3,951,642 and 3,996,021 to Chang et al. disclosed a pack cementation process to produce Hf modified aluminide coatings. Later, U.S. Pat. Nos. 5,989,733, 6,136,451, 6,689,422 to Warnes et al. and U.S. Pat. No. 6,602,356 to Nagaraj et al. disclosed a CVD process to produce Platinum (Pt)-aluminide coatings with or without Hf addition. U.S. Pat.

Nos. 6,514,629 and 6,582,772 to Rigney et al. taught Hf—Si-modified Pt-aluminide coatings formed by the steps of providing a substrate, depositing layers containing the platinum, aluminum, hafnium, and silicon, and heating the layers so that the aluminum, hafnium, and silicon diffuse into the layer of platinum to form a protective layer.

Pack cementation, CVD and vapor phase process are three potential industrial diffusion coating processes for forming Hf-modified aluminide diffusion coatings. Among them, the vapor phase process has the potential to offer many advantages. The others have drawbacks. Though used with some successes, pack cementation processes for both hafnium-modified aluminide and simple aluminide coatings share the same disadvantages, such as the need for an inert filler, the obstruction of cooling holes, and the embedded particles on the formed coating surface. While avoiding these shortcomings, a significant disadvantage of using a CVD process to form a hafnium-modified aluminide coating is the considerable equipment cost. In view of these disadvantages of pack and CVD processes, alternative deposition methods, such as vapor phase process, have been sought.

The information of vapor phase process for Hf-modified aluminide coatings is limited. U.S. Pat. No. 6,332,931 to Das et al. disclosed a vapor phase coating process to produce aluminide-hafnide coatings by using Hf metal or Hf-containing metallic alloys as Hf donor materials; as a result, the synthesized coatings contain about 0.5 to about 60 weight percent hafnium and about 12 to about 38 weight percent aluminum. However, too high Hf content in aluminide coatings can lead to the formation of Hf-rich precipitated phases in the coating or on the coating surface, such as HfC, $HfO_2$, and $Ni_2AlHf$ etc, and furthermore, deteriorate the mechanical properties and the oxidation resistance of the aluminide coatings. Therefore, there is a need to develop low Hf content aluminide coatings whose application on turbine engine components, as either environmental coatings or the bond coat in a thermal barrier coating system, can significantly improve the gas-turbine performance. Due to the difficulty on the control over Hf and Al codeposition and the complex process parameters of the diffusion coating process, even though Hf modified aluminide coatings have been investigated for several decades, very limited information of Hf-modified aluminide diffusion coatings for industrial applications has been reported.

A significant obstacle to the use of vapor phase processes has been the inability to adequately control the co-deposition of aluminum and reactive elements, such as Hf, from suitable sources to the article to be coated. Unfortunately, the resultant aluminide coatings tend to incorporate too much hafnium when vapor phase processes are used. This leads to coatings whose mechanical properties and/or service life can be unduly compromised. Therefore, there is a strong desire and need in the industry to be able to use vapor phase coating techniques in a way that offers improved control over the co-transfer of aluminum and reactive element(s) such as Hf.

SUMMARY OF THE INVENTION

The present invention provides strategies to practice vapor phase coating techniques with improved control over the co-transfer and co-deposition of aluminum and reactive element(s) from sources to the article being coated. In particular, the present invention appreciates that dramatically improved control of the co-transfer and co-deposition results in this context with the appropriate selection of the reactive element source. In the vapor phase coating context, improved control results when at least a portion of the reactive element source includes a non-halide compound of the reactive element, such as an oxide, nitride, carbide, and the like. In contrast, when using metallic or halide sources, excessive or otherwise uncontrolled reactive element levels in the coating may tend to result.

The present invention may be used to apply coatings that protect any articles from a hostile operating environment. In preferred modes of practice, the coatings protect against oxidation, hot corrosion, or other degradation in high temperature and/or chemically hostile environments. The coatings also may be used as a bond coat in thermal barrier coating systems.

In one aspect, the present invention relates to a method of coating an article, comprising the steps of:

providing the article, said article having a metallic surface;

providing a reactive element source, wherein at least a portion of the reactive element source comprises a non-halide compound of a reactive element;

providing an aluminum source;

providing a halide activator; and heating the article, reactive element source, aluminum source, and halide activator under conditions effective to cause species comprising aluminum and the reactive element to be co-deposited onto said metallic surface to form a coating.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein:

FIGS. 4A, 4B, 4E and FIGS. 4C, 4D, 4F are surface, cross-sectional images and GDMS results respectively of Hf-modified aluminide coatings on WASPALOY™ nickel-base and INCONEL™ 718, respectively, nickel-base superalloy flat samples.

FIGS. 9A, 9B, 9C and 9D are cross sectional images of the MarM 247 substrate turbine vanes, INCONEL 738 turbine vanes, CMSX-3 turbine blades, and MarM 509 turbine vanes with the invented Hf-modified aluminide coatings, respectively.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1:
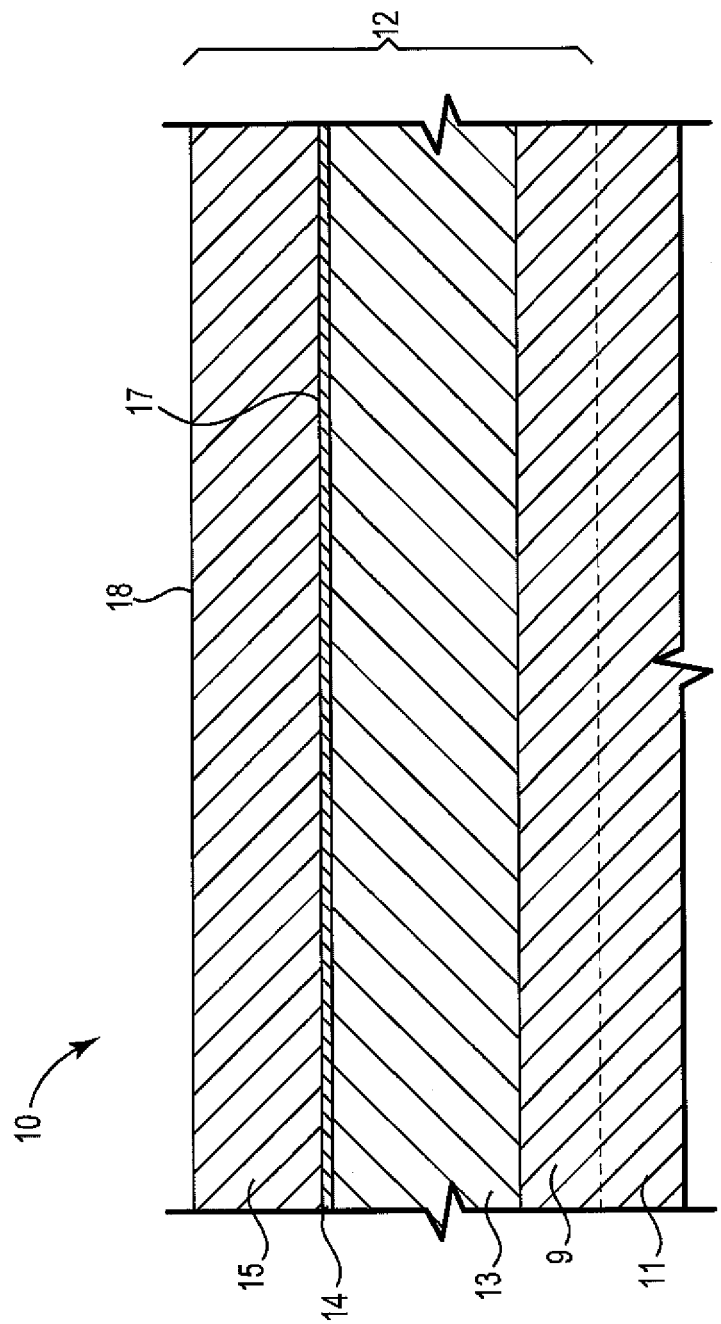
FIG. 1 is a cross-sectional diagram of a metallic article with a thermal barrier coating.

FIG. 1 schematically shows a cross-section of a portion of a coatedin article 10 manufactured in accordance with principles of the present invention. In representative embodiments, article 10 is a constituent of a rocket, missile, aircraft, marine vessel, industrial facility, power utility, electric motor, chemical manufacturing facility, heat exchanger, and/or the like. The principles of the present invention are desirably practiced in such applications where protection against oxidation in a high temperature environment, e.g., above about 450° C., preferably above about 650° C., more preferably above about 850° C., is desired. In preferred embodiments, article 10 is a constituent of a gas turbine engine such as being all or a portion of a high pressure turbine nozzle, low pressure turbine nozzle, turbine shroud, turbine blade, turbine vanes, and/or the like. Article 10 can be a new part, a replacement part, or a repaired part. The article 10 can be casted, molded, machined, directionally solidified (DS), fabricated from a single crystal (SX), and/or fabricated in any other desired method.

The article 10 includes a body 11 that serves as a substrate for thermal barrier structure 12. Body 11 includes a metallic composition that may be a pure metal, an intermetallic composition, an alloy, combinations of these and the like. The body may contain a single phase or may contain multiple phases, e.g., an alloy matrix with intermetallic precipitates. Body 11 may be amorphous, crystalline, and/or the like. In addition to metal and/or intermetallic constituents, body 11 may also contain other constituents. For instance, body 11 may be a composite that includes a metallic matrix and fibers (not shown) or the like.

In preferred embodiments, body 11 includes nickel (Ni)-base, cobalt (Co)-base, titanium (Ti)-base, or iron (Fe)-base alloys. The term "Ni-base alloy" means that Ni is the dominant element in the alloy, e.g., more Ni is present than any other metal element in the alloy. Similarly, Co, Ti, and Fe are the dominant element in Co-base, Ti-base, and Fe-base alloys, respectively. The alloy may include one or more other alloying elements such as chromium, aluminum, titanium, molybdenum, iron, manganese, tungsten, boron, niobium, tantalum, cobalt, silicon, rhenium, platinum, hafnium, zirconium, yttrium, combinations of these and the like. Preferably, the alloy includes more nickel and/or cobalt than any other individual element. In some embodiments, alloys of nickel, cobalt, and/or nickel-iron (with or without other alloying elements) are known as superalloys due to excellent mechanical strength, creep resistance and good surface stability at high temperatures. Examples of superalloys are HASTELLOY™, INCONEL™, WASPALOY™, RENE™ alloys (e.g. RENE 41, RENE 80, RENE 95, and RENE 104), HAYNES™ alloys, INCOLOY™, MP98T, TMS alloys, and CMSX single crystal alloys.

Optionally, body 11 may include one or more layers. For instance, in some instances, a layer of platinum (not shown) may be deposited to form a surface layer on at least a portion of body 11. At high temperatures, the platinum can diffuse and incorporate into the below-mentioned aluminide coatings to enhance the oxidation protection of body 11. The incorporation of platinum can also enhance the mechanical properties of the aluminide coatings. However, due to the extra expense, using a platinum layer is not cost effective in some modes of practice.

Thermal barrier structure 12 includes protective coating 13, a thermally grown oxide layer 14, and an optional ceramic topcoat 15. Protective coating 13 helps to protect body 11 against oxidation, particularly in high temperature environments (e.g., environments in which the temperature is above about 450° C., preferably above about 650° C., more preferably above about 850° C.). In the practice of the present invention, protective coating 13 comprises an aluminide. As used herein, an aluminide refers to a metallic solid solution or an intermetallic composition that includes aluminum and at least one major metal element from the substrate body 11. Examples of such other metal elements include nickel, cobalt, titanium, iron, chromium, combinations of these and the like.

Aluminide compositions comprising aluminum and nickel are preferred. In the present invention, nickel aluminides containing from about 45 to about 70 atomic percent Ni based on the total amount of nickel and aluminum are preferred. Such compositions provide a good balance between high temperature oxidation resistance and acceptable mechanical properties. In contrast, when more Ni is present relative to aluminum, then the oxidation resistance may tend to be less. When less Ni is present relative to aluminum, then the aluminide may become more brittle. A phase diagram for the binary Al—Ni system shows five aluminum and nickel-containing phases. These include aluminum rich phases $Al_3Ni$ and $Al_3Ni_2$. These also include the nickel rich phases $Al_3Ni_5$ and $AlNi_3$. A fifth phase includes AlNi which generally exists when the aluminide includes from about 45 to about 70 atomic percent nickel based on the total amount of nickel and aluminum. Accordingly, it is believed that at least a dominant portion of a nickel aluminide exists as the AlNi phase when a nickel aluminide contains from about 45 to about 70 atomic percent Ni based on the total amount of nickel and aluminum.

Aluminide, protective coatings 13 of the invention also include low reactive element content within both the outward growth portion and the interdiffusion zone, but excluding precipitated phases containing either Hf or/and Pt (if any). Advantageously, the low content of the reactive element offers excellent oxidation protection by minimizing the amount of oxidized scale and enhancing the adherence of the scale to the protective coating 12.

As used herein the weight percent of Hf in the coating is based upon the total weight of all elements in the aluminide coatings within the tested volume (described below) with respect to the outward growth portion or the interdiffusion zone of coating 13. In addition to Hf and Al, other elements that might be present may include Ni, Co, Cr, Mo, W, Ta, Nb, Ti, Fe, Mn, Si, Zr, V, C, B, S, P, and the like, depending in part on the composition of body 11.

Throughout the coating depth, the composition of each element, such as Hf, tends to vary significantly. However, at the same coating depth from the coating surface, the composition of each element tends to be substantially consistent. Accordingly, to obtain the Hf composition at a specified coating depth from the coating surface, such as 5 microns from the coating surface, a representative number of sample volumes (e.g., from 1 to 10 samples, preferably 3 samples) at the specified depth in either the outward growth portion or the interdiffusion zone of the coating can be tested, and then the weight percent of Hf at that depth can be computed as an average.

In the practice of the invention, a suitable test volume for obtaining Hf composition at a specified coating depth generally has its center at the specified depth in the direction of the coating depth, such as a volume in a depth ranging from 4 microns to 6 microns for obtaining Hf composition at a depth of 5 microns. If the specified depth is termed as "D" microns, and the suitable depth range for the suitable tested volume is termed as "D±d" microns, then the suitable "d" is desired to be less than 3 microns, preferably less than 2 microns. The tested volume varies depending on other dimensions, such as width and length in the case of approximately cubic geometry of the tested volume. The suitable tested volume is desired to be at least 1 cubic micron. The maximum volume may vary depending on other dimensions except the depth dimension, which is in part due to the testing methods. It also is desirable that the test volume not span both the outward growth portion and the interdiffusion zone as the interface between the two zones tends to contain precipitated phases that are relatively richer in Hf than the surrounding coating regions.

It is useful to obtain data from three representative test volumes for obtaining Hf composition at a specified coating depth in either the outward growth portion of the coating or the interdiffusion zone. The tested volume should contain no precipitated phases that contain either Hf or Pt (if any). One significant difference between the precipitated phases and the surrounding coating regions is the difference in terms of the phase crystalline structure as well as the composition that makes the "precipitated phase" appear in a different color on a metallurgical sample in a suitable preparing condition.

A variety of test methods may be used to obtain the data. Examples include Glow Discharge Mass Spectrometry (GDMS), Energy Dispersive Spectroscopy (EDS), and the like. In the event that GDMS, EDS or other test methods provide inconsistent data, then the GDMS data shall control.

Although the Hf content of the coating may vary generally as a function of depth in the coating, it is desirable that the Hf content determined at any depth within either the outward growth portion or the interdiffusion zone is within a desired range. In representative embodiments, the Hf content in the tested sampled volume of the coating 13 includes from about 0.01 to about 4 weight percent, even about 0.01 to about 2 weight percent, or even from about 0.05 to about 0.5 weight percent, and even about 0.1 to about 0.3 weight percent of one or more reactive elements. In other words, even though the reactive element content might differ as a function of the depth of the sampled volume, the various samples taken from the various depths of the coating 13 preferably would have a reactive element content within this range.

In some instances, the desired reactive element content may depend upon the nature of the composition of body 11 on which coating 13 is formed. For instance, in one illustrative embodiment, the Hf content in a protective aluminide coating is generally less than 0.5 weight percent based on the total weight of all elements in the tested coating volume of the aluminide coatings when formed over bodies 11 including Ni-base superalloys. In another illustrative embodiment, the Hf content in a protective aluminide coating is generally less than about 2 weight percent based on the total weight of all elements in the tested coating volume of the aluminide coatings when formed over bodies 11 including Co-base superalloys. In another illustrative embodiment, the Hf content in a protective aluminide coating is preferably less than 0.5 weight percent, more preferably about 0.1 weight percent to about 0.3 weight percent, when formed on bodies 11 that includes a Co- and Ni-base superalloy.

As used herein, a reactive element refers to a material whose presence in the aluminide composition enhances the ability of the protective coating 13 to protect body 11 against oxidation relative to a coating made in the same way from the same source materials in the same proportions but without the reactive element(s) being present. Representative reactive elements include hafnium (Hf), zirconium (Zr), yttrium (Y), lanthanum (La), cerium (Ce), combinations of these, and the like. In preferred embodiments, a reactive element comprises at least one of Hf, Zr, and/or Y and is derived from a reactive element source wherein at least a portion of the source includes a non-halide compound of the reactive element such as an oxide, other oxygen-containing compound, nitride, carbide, and/or the like. Due to the similarity of all these reactive elements in terms of addition techniques to aluminide coatings and the beneficial effect of the addition, the discussion of these materials throughout this specification will focus on Hf for convenience. The skilled worker will understand that the discussion of Hf is applicable to the other reactive elements as well.

Advantageously, the aluminide coatings of the present invention are prepared using vapor phase coating techniques. The present invention is significant by enabling vapor phase coating techniques to be used in this context. In the past, it has been highly desirable to use vapor phase coating techniques to prepare aluminide coatings with controlled, lower levels of reactive element content, but conventional vapor phase techniques have offered too little control over co-deposition of the reactive element species. This has resulted in aluminide coatings with reactive element content that is too high to provide satisfactory coatings with satisfactory service life. The present invention offers a dramatic gain in control. By using reactive element source(s) that comprise non-halide compounds of the reactive element (e.g., oxides such as $HfO_2$ in the case of Hf), the present invention allows vapor phase techniques to be used to prepare protective aluminide coatings with controlled, lower levels of reactive element content.

In addition to aluminum, one or more additional, optional precious metal constituents (including gold, silver, platinum, and palladium; platinum is preferred.), and one or more reactive elements, an aluminide composition of the present invention may also include one or more other metal species. Examples of these include Ni, Co, Cr, Mo, W, Ta, Nb, Ti, Fe, Mn, Si, V, combinations of these, and the like.

In actual practice, the process that deposits protective coating 13 is performed at an elevated temperature. During the deposition, a portion of the material that forms coating 13 will form an outward-growth coating portion generally over the surface of body 11. Another portion of the material that forms coating 13 will interdiffuse into and with the material of body 11, forming an interdiffusion zone 9 that extends to some depth into body 11. At the same time, some of the constituents of body 11 may diffuse into the deposited coating 13. For purposes of the present invention, interdiffusion zone 9 is considered to be a portion of the coating 13 even though it extends downward into body 11.

The protective coating 13 may be a single phase or may include minor amounts of one or more additional Hf containing phases. For instance, if the Hf content is closer to the upper limits of the ranges described herein, a small amount of fine Hf-rich precipitated phases could be found in the coatings such as at the surface of coating 13, at the interface between the additive layer (also referred to as the outward growth portion of the aluminide coatings) and the interdiffusion layer, and/or in the outward growth portion of coating 13 is acceptable. Minor amounts in this context means that less than 2 weight percent of coating 13 includes one or more additional Hf-containing phases. More preferably, substantially no such additional Hf phases are present. In other words, preferably substantially all of the Hf is preferably in a solid solution state. The interdiffusion zone typically might also contain precipitated phase(s) rich in some refractory elements such as W, Mo, and/or the like or phases rich in Cr. In part, the composition of the precipitated phase(s) in the interdiffusion zone depends on the composition of body 11. In preferred embodiments, the outward growth portion of coating 13 comprises a single β phase microstructure, such as β-NiAl, β-CoAl or β-(Ni, Co, Pt)Al phase depending on the substrate composition. Other elements in the outward growth portion of coating 13 can be Cr and/or Si, as well as some refractory elements that come from body 11 via diffusion at the high temperatures of the vapor phase coating process.

The coating 13 may have a thickness within a wide range. The thickness mentioned here is the total thickness of the outward growth portion and the interdiffusion zone. In many embodiments, a suitable thickness for coating 13 is similar to the thickness of conventional industrial coatings, typically about 25 to 125 micrometers (about 0.001-0.005 inch).

Ceramic topcoat 15 helps to extend the service life of article 10 by reducing the surface temperature at the surface 17 of thermally grown oxide layer 14 relative to the surface 18 of the topcoat 15. In practice, it is believed that the temperature differential between surfaces 17 and 18 is above 100° C.

The ceramic topcoat 15 can be formed from a wide variety of ceramic materials. Suitable ceramic materials have one or more of low thermal conductivity, high oxygen permeability, and a relatively high coefficient of thermal expansion. In a representative embodiment, the topcoat 15 includes yttria-stabilized zirconia (YSZ) that contains about 2 to about 12 weight percent, preferably about 4 to about 8 weight percent yttrium oxide.

In those embodiments in which topcoat 15 has high oxygen permeability, the protective coating 13 desirably is resistant to oxidation attack. Desirably, therefore, the protective coating 13 is sufficiently rich in Al to form a layer 14 that is a protective thermally grown oxide (TGO) scale of $\alpha$-$Al_2O_3$. In addition to imparting oxidation resistance, the TGO helps bond the ceramic topcoat 15 to the protective coating 13. In practice, a portion of the layer 14 forms in situ during the manufacture of article 10 such as when the topcoat 15 is formed at relatively high temperature. Additional portions may form in situ during the service life of article 10.

Figure 2:
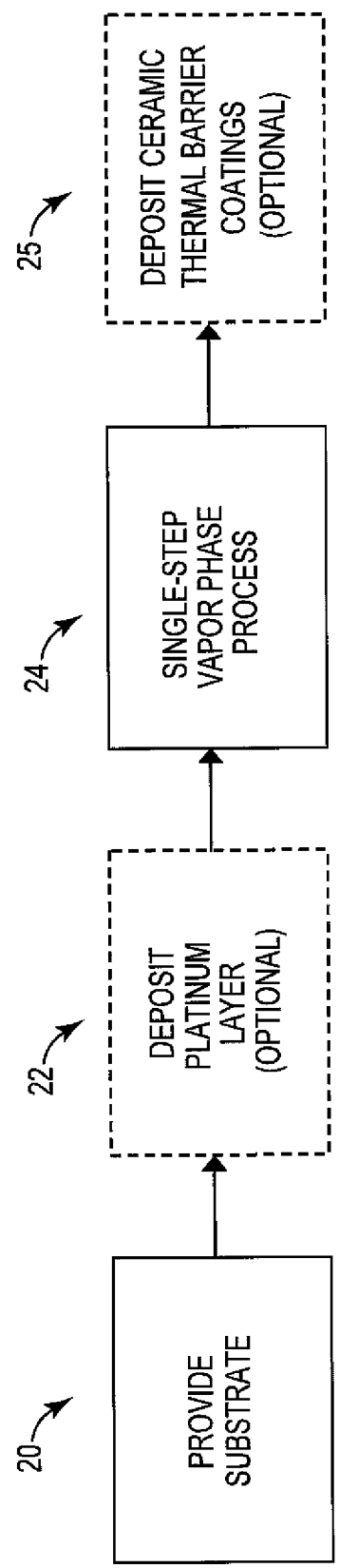
FIG. 2 is a block flow diagram of a preferred approach for practicing the invention.

FIG. 2 shows a block flow diagram of a preferred approach to produce aluminide coatings of the present invention using vapor phase techniques. In step 20, the substrate to be coated (e.g., body 11) is provided. Optionally, the surface of body 11 can be appropriately cleaned, activated, or otherwise treated. For instance, if body 11 is an original or replacement part, the surface can be cleaned such as by grit blasting or the like. If body 11 is a used part that is being repaired, then a stripping process can be used to remove previous coatings. This can be followed by a suitable surface cleaning operation.

According to step 22, body 11 optionally can be coated with a layer comprising Pt and heat treated. The Pt-containing layer can be deposited by any suitable method. Preferably, the platinum-containing layer is deposited using an electroplating process and a suitable platinum source, such as a Pt P-salt with a formula of $Pt(NH_3)_2(NO_2)_2$ or Pt Q-salt with a formula of $[Pt(NH_3)_4]HPO_4$.

In step 24, a vapor phase coating process (e.g., a single step vapor phase process) is used during which constituents comprising Al and at least one reactive element are co-deposited onto body 11 to form a reactive element modified aluminide diffusion coating. As used herein, "reactive element modified" means that the coating includes a reactive element. Optionally, step 24 may further involve heat treating the reactive element modified aluminide coating to adjust the coating microstructure and composition distribution. A process for forming such aluminide coatings is described in more detail below in connection with FIG. 3.

Still referring to FIG. 2, in step 25, a ceramic topcoat (e.g., ceramic topcoat 15) optionally is deposited onto the reactive element modified aluminide coating. The topcoat can be formed in a variety of ways. In some embodiments, the topcoat may be applied either by air plasma spraying or electron beam physical vapor deposition. In many embodiments, the topcoat has a thickness of about 100 microns to 400 microns.

A process for preparing reactive element modified aluminide coatings of the present invention will now be described in more detail with respect to FIG. 3. For purposes of illustration, the process will be described in the context of preparing Hf-containing aluminide coatings in which the Hf is obtained from a source including an oxide, nitride, or carbide of Hf such as $HfO_2$, HfN, and HfC. It will be understood that coatings containing other reactive elements such as Zr, Y, La and/or Ce (optionally with Hf) derived from corresponding oxides, nitrides, or carbides of these could be prepared by replacing the Hf sources described herein with their comparable sources.

Figure 3:
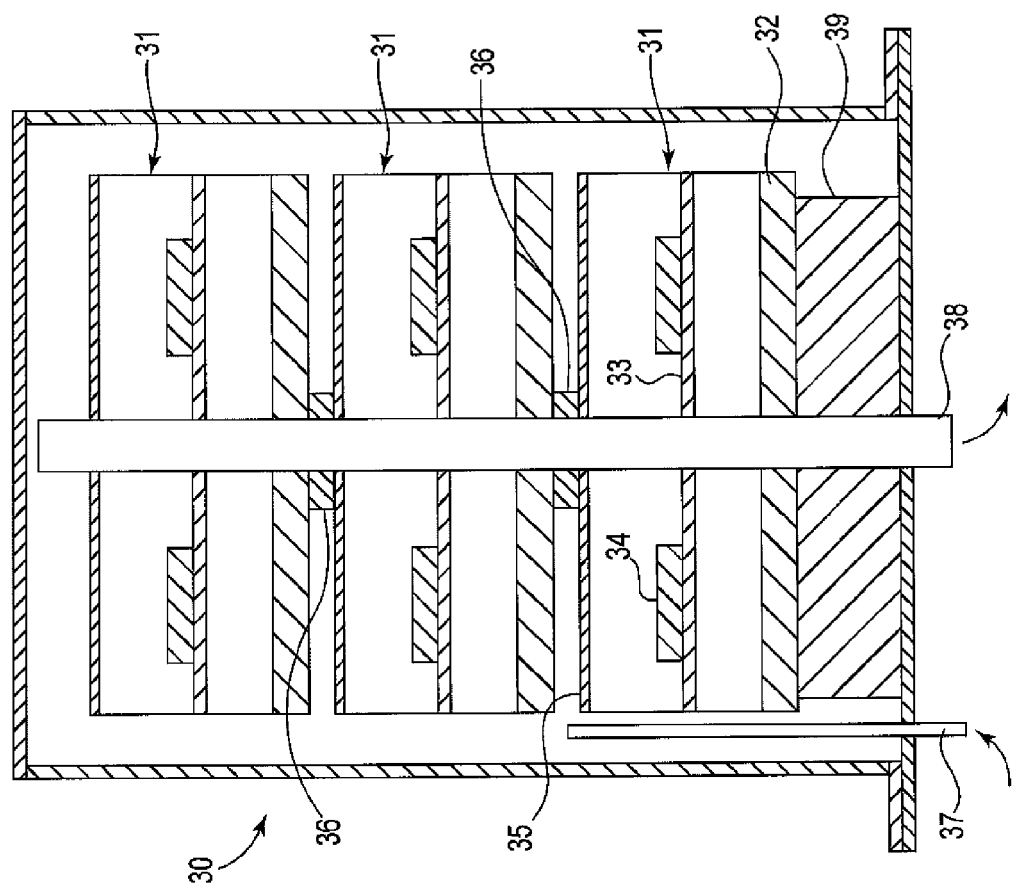
FIG. 3 is a schematic view of the vapor phase coating apparatus for forming a Hf modified aluminide coating.

FIG. 3 shows a system 30 in the form of a retort that is used to produce the representative Hf-containing aluminide coatings. Referring now to FIG. 3, inside the retort are three coating chambers 31. Retorts containing a lesser or greater number of such chambers could be used, if desired. For instance, other retort embodiments might include only one or two chambers 31 on the one hand, or perhaps four or more chambers on the other hand. When multiple coating chambers 31 are used, the bottom coating chamber 31 sits on a furnace base ceramic supporter 39. Supporter 39 is used to separate chamber 31 and the bottom of the retort because of the temperature differential between these components. The temperature of chamber 31 is relatively high, while the temperature of the retort bottom is relatively low. Between adjacent chambers 31, a ceramic spacer 36 can be used to thermally isolate adjacent chambers. In some modes of practice, chambers 31 may differ from one another such as when different procedures are to be used in respective chambers, or when one chamber is larger to accommodate larger parts, or when different process materials are used, and/or the like. In this representative system 30, the three coating chambers 31 are identical. Accordingly, the bottom coating chamber 31 will be described further herein with the understanding that the description applies to the other two chambers 31 as well unless otherwise expressly noted.

The Hf-containing aluminide coating of the present invention are obtained from ingredients comprising an aluminum source, a Hf source, and a halide activator. These ingredients may be supplied in any convenient form such as a fine powder, nuggets, pellets, granules, flakes, or the like. In preferred embodiments, the aluminum source materials are supplied as nuggets having an average particle size of about 3 mm to about 20 mm. These can be supplied in any convenient shape, such as irregular, dendritic, acicular, cubic, spheroidal, fibrous, combinations of these, and the like. The Hf source materials are preferably supplied as fine powders having an average size less than 200 microns. The activator materials are preferably supplied as fine powders having an average size less than 1 mm. A mixture 32 of the Hf source, the Al source material, the activator, along with any other desired ingredients is loaded onto the bottom of chamber 31. Although one or more inert filler materials may be used, it is more preferred that the mixture 32 includes substantially no inert filler materials.

The Al source can be Al-rich alloys optionally containing other elements such as Cr, Co, Ni, Fe, Mo, W, Mn, Ti, Y, Zr, Pt, Hf, combinations of these, or the like. The Al content in the Al source desirably is about 3 weight percent to about 99 weight percent, preferably from about 15 weight percent to about 50 weight percent of the total Al source material, with the remainder being one or more other elements. A particularly preferred Al source includes from about 25 weight percent to 35 weight percent Al. The amount of Al source materials desirably is about 0.3 kg to about 7 kg per cubic foot of the internal volume of chamber 31, preferably from about 2 kg to about 4 kg per cubic foot of the internal volume of chamber 31.

At least a portion of the Hf source desirably includes a nonhalide compound of Hf such as an oxide, nitride, carbide, or the like. In an illustrative embodiment, a preferred Hf source is $HfO_2$. Advantageously, using an oxide of Hf as a source provides excellent control over the Hf activity when using vapor phase techniques for co-deposition of Hf and Al. In addition, the Hf source optionally may include other Hf-containing species such as metallic Hf (including pure Hf, Hf alloys and Hf intermetallics), halides of Hf, other salts of Hf, combinations of these, and the like. Examples of such other kinds of Hf-containing species include $HfCl_4$, $HfF_4$, Hf powder, combinations of these, and the like. If other Hf-containing species such as those noted are substituted for $HfO_2$, these desirably would be used in amounts sufficient to achieve an equivalent level of Hf activity in a vapor phase process with all other process parameters unchanged, such as temperature, composition and amount of Al source, species and amount of activator, the loading condition of the mixture 32 and the like. Desirably, at least 25 weight percent, preferably at least about 50 weight percent, more preferably substantially all of the Hf source is such a compound. The amount of Hf source materials desirably is about 1 weight percent to about 30 weight percent of Al source materials, preferably about 3 weight percent to about 10 weight percent of the Al source materials.

The activator includes one or more halide salts. Suitable halide activators include $AlF_3$, $AlCl_3$, $NH_4F$, $NH_4Cl$, NaF, NaCl, KF, KCl, which preferably shall be present as a powder within the coating chamber. $AlF_3$ is a preferred activator that is preferably used in amounts of about 0.4 to 2.4 moles per cubic foot of the internal volume of chamber 31, preferably of about 1.0 mole to about 1.5 moles per cubic foot of the internal volume of chamber 31. If other halide activators such as those noted are substituted for $AlF_3$, these would be used in amounts sufficient to achieve an equivalent level of activator activity.

One or more articles 34 to be coated are loaded into the coating chamber 31 and sit on a suitable support such as metal screen 33. Accordingly, during vapor phase processing in the chamber 31, article 34 being coated remains out of contact with the mixture 32 during the coating process. The distance between metal support screen 33 and the donor/activator mixture 32 can be changed to affect the thickness and composition of the produced coatings. In a representative mode of practice to prepare coatings with a Hf content of about 0.3 to about 0.5 weight percent in the outward growth portion and interdiffusion zone based on the total weight of all elements in the tested coating volume of the aluminide coatings as defined above, a suitable distance between support screen 33 and the top surface of the mixture 32 is about 9 to 20 cm. The coating chamber desirably is covered with a metal lid 35.

To carry out a coating process, the contents of chamber 31 are heated in a non-oxidizing atmosphere (which may be an inert or reducing atmosphere in some embodiments) at suitable temperature(s) for suitable time period(s) in order to develop the desired coating on article 34. The protective gases, such as argon or hydrogen, shall flow into the retort through a piping 37 and then flow out of the retort through a piping 38. A vent hole (not shown in FIG. 3) at the side of chamber 31 and/or some gaps (not shown in FIG. 3) may exist between lid 35 and chamber 31. At the beginning of the process, protective gases flow into the chamber through the hole to expel the atmospheric air to avoid oxidation during the vapor phase process. In illustrative embodiments, chamber 31 and its contents are heated at one or more temperatures in the range from about 900° C. to about 1150° C. for a time period from about two minutes to about ten hours, preferably about 2 hours to about 10 hours. A particularly preferred treatment occurs at a temperature of about 1050° C. to about 1100° C. for a period of at least two hours.

Without wishing to be bound, the following reaction sequence can be proposed. Heating vaporizes the halide activator. This vapor then reacts with the hafnium and aluminum of the source materials to produce aluminum halide and hafnium halide vapors. These vapors then react at the surface of article 34 to release the Al or Hf atoms. These atoms can then be deposited onto and/or diffuse into article 34 to form Hf-containing aluminide coatings at very low weight contents of the Hf in the coating.

The present invention will now be described in accordance with the following illustrative examples. The examples describe making several illustrative embodiments of the invention.

According to two embodiments, flat samples containing Ni-base superalloys (WASPALOY and INCONEL 718, respectively) were coated to produce coatings of the present invention with a Hf content in the outward growth portion and in the interdiffusion zone of up to about 0.7 weight percent in the coatings based on the total weight of all elements in the tested coating volume of the aluminide coatings as defined above.

In another embodiment, a flat sample of a Ni-base superalloy (WASPALOY) was electroplated with a Pt layer, heat treated, and then coated using a vapor phase process of the present invention. This produced a coating of the invention including a Hf content in the outward growth portion and in the interdiffusion zone of up to about 0.35 weight percent in the coating based on the total weight of all elements in the tested coating volume of the aluminide coatings as defined above.

In yet another embodiment, a flat sample of a Co-base superalloy (HS-188) was coated using a vapor phase process of the invention to produce a coating containing a Hf content in the outward growth portion and in the interdiffusion zone of up to about 1.6 weight percent in the coating based on the total weight of all elements in the tested coating volume of the aluminide coatings as defined above.

In yet another embodiment, three turbine engine components containing a Ni-base superalloy and another turbine engine component containing a Co-base superalloy engine component were coated using a vapor phase process of the invention. This produced coatings with a Hf content in the outward growth portion and in the interdiffusion zone of: (1) up to about 0.14 weight percent on INCONEL 738 alloy turbine vanes based on the total weight of all elements in the tested coating volume of the aluminide coatings as defined above, (2) up to about 0.55 weight percent of Hf in the outward growth portion and in the interdiffusion zone on a CMSX-3 single crystal turbine blade based on the total weight of all elements in the tested coating volume of the aluminide coatings as defined above, (3) up to about 2 weight percent of Hf in the outward growth portion and in the interdiffusion zone on a MarM 247 turbine vane segment based on the total weight of all elements in the tested coating volume of the aluminide coatings as defined above, and (4) up to about 4 weight percent of Hf in the outward growth portion and in the interdiffusion zone on a MarM 509 Co-base turbine vane segment based on the total weight of all elements in the tested coating volume of the aluminide coatings as defined above.

EXAMPLE 1

One WASPALOY Ni-base alloy flat sample with a size of 80×55×1.1 mm and an INCONEL 718 Ni-base alloy flat sample 64×27×1.6 mm were grit blasted and vapor phase coated in the apparatus of FIG. 3. The size of coating chamber 31 was 0.685 meter (27 inches) in diameter and 0.254 meters (10 inches) in depth. The mixture 32 contained 9.072 kg (20 lbs) 30Al-70Cr (wt. %) nuggets with a size of about 3.5 mm×17.5 mm, 0.454 kg (1 lb) $HfO_2$ powder with a powder size of about 44 microns, and 0.3 kg $AlF_3$ powder with a powder size of about 200 microns. The distance between support screen 33 and the mixture 32 was about 9 cm. The vapor phase process temperature was about 1975° F. (1079° C.) for about 6 hours.

Figures 4E, 4F:
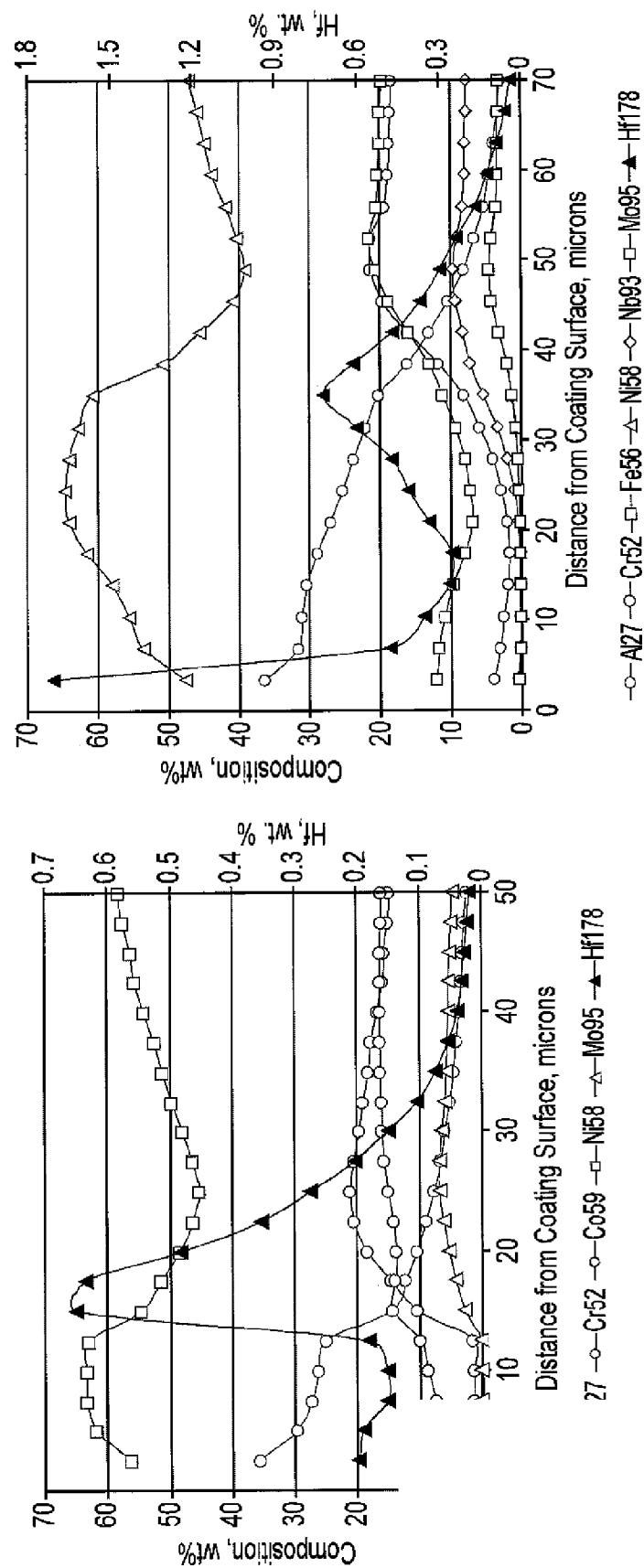

The sample surface morphology, cross-section microstructure, and Glow-Discharge Mass Spectrometry (GDMS) composition profile for the WASPALOY sample along the coating depth are shown in FIGS. 4A, 4B and 4E, respectively, and for the INCONEL sample in FIGS. 4C, 4D and 4F. The white phase at the coating surface and the interface between the additive layer and interdiffusion layer is the Hf-rich phase. Related to this Hf-rich phase, the GDMS spectrum (FIGS. 4E and 4F) shows Hf content peaks.

EXAMPLE 2

A WASPALOY Ni-base alloy flat sample with a size of 38×26×1.1 mm was vapor-degreased, grit blasted, ultrasonic cleaned, and Pt electroplated using a Q-salt solution provided by Johnson Matthey Inc. (of West Deptford, N.J.) in the following experimental conditions: Pt concentration of 5 g/dm3, pH value range of 10.2-10.6, and at temperature of 90~95° C. During the plating process, the current density was controlled to be within 2~5 mA/$cm^2$, and the Pt thickness was controlled to be 4-7 microns. After the Pt electroplating process, the sample was heat treated in vacuum at 1925° F. (1052° C.) for 1 hour. Then the sample was grit blasted and vapor phase coated in the same conditions as in the above-mentioned Example 1.

Figure 5B:
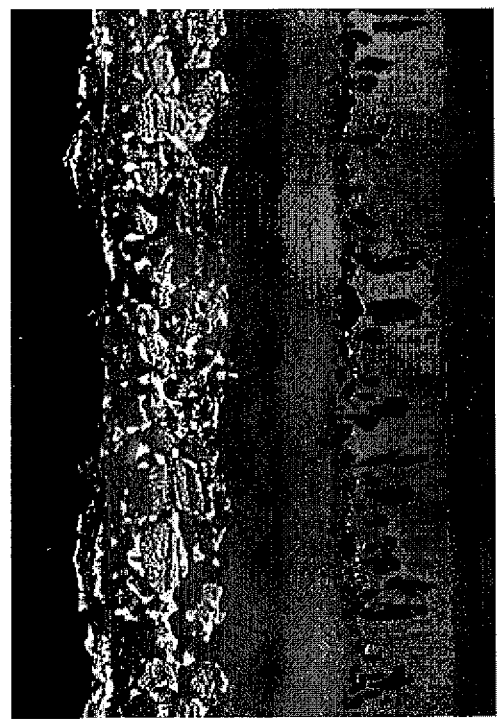
FIGS. 5A, 5B and 5C are surface, cross-sectional images, GDMS results of (Hf and Pt)-modified aluminide coatings on a WASPALOY flat sample in as-coated condition.
Figure 5A:
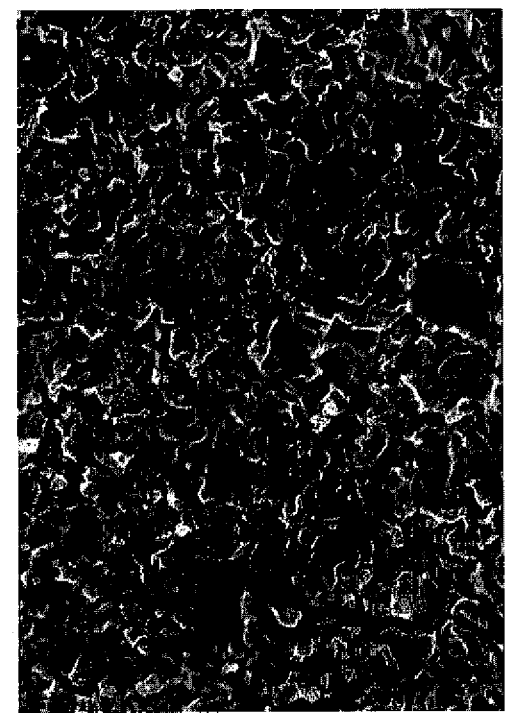
Figure 5D:
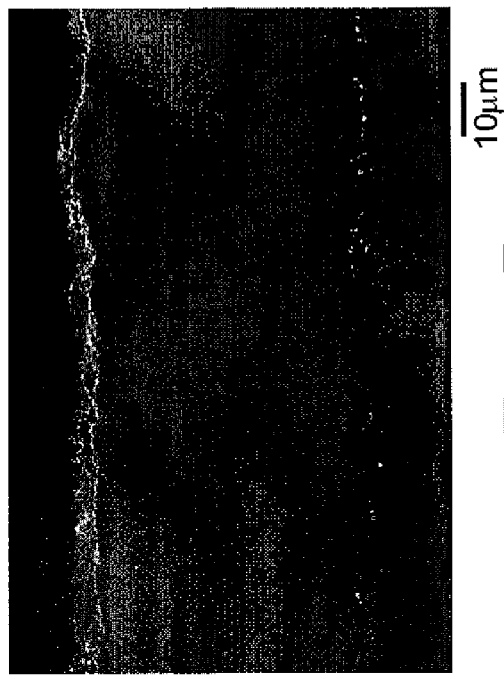
FIG. 5D is the cross-sectional image of the (Hf and Pt)-modified aluminide coatings after a heat treatment process.
Figure 5C:
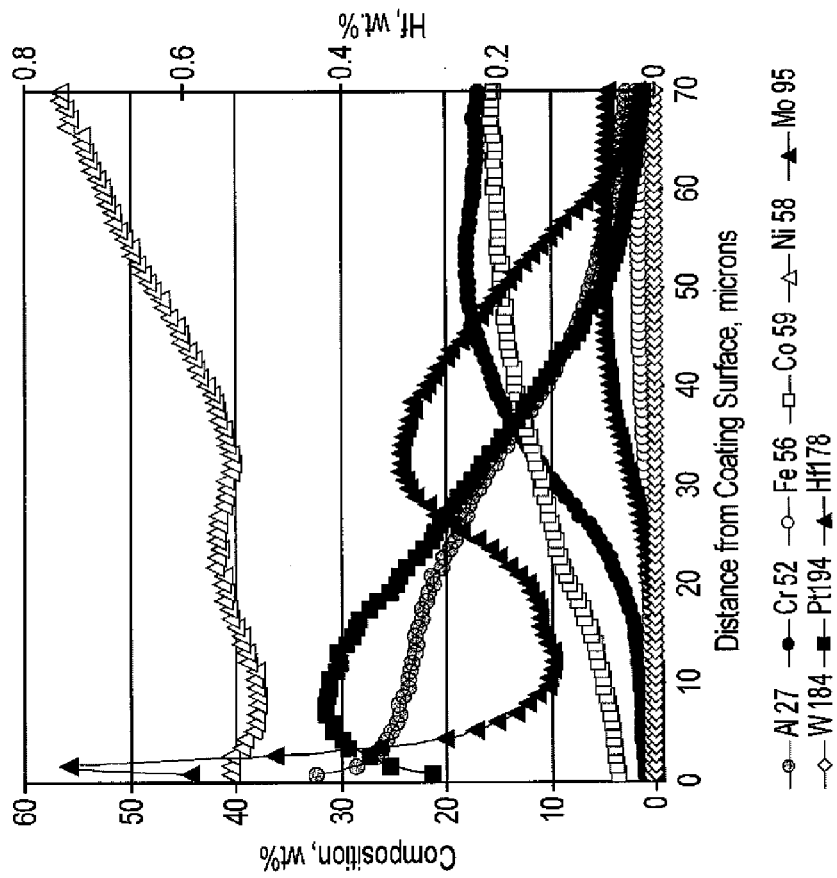

The sample surface morphology, cross-section microstructure, and GDMS composition profile along the coating depth are shown in FIGS. 5A, 5B and 5C, respectively. The developed coatings showed $\zeta$-$PtAl_2$ phases in the $\beta$-(Ni,Pt)Al matrix. GDMS spectrum indicates Hf incorporation, especially high Hf content at the coating surface, indicating precipitated Hf-rich phases on the surface. The $\zeta$-$PtAl_2$+$\beta$-(Ni,Pt)Al coating microstructure can be transformed into single phase $\beta$-(Ni,Pt)Al coatings via a suitable heat treatment process.

The heat treatment temperature can be within a range from about 900° C. to about 1200° C. for several hours. The time length of the heat treatment process depends on the temperature, the percentage of the $\zeta$-$PtAl_2$ phase in the coatings and the substrate materials. For example, the $\zeta PtAl_2$+$\beta$-(Ni,Pt)Al coating microstructure in FIG. 5B is transformed into a single phase $\beta$-(Ni,Pt)Al coating microstructure via a heat treatment at 1177° C. (2150° C.) for 2 hours, as shown in FIG. 5D. However, Hf-rich phase at the coating surface and interface between the additive layer and the interdiffusion layer was not significantly affected. Before the application of the coating, the coating surface containing Hf-rich phases can be optionally removed via a suitable method, such as grit blasting.

EXAMPLE 3

A Co-base alloy (HS-188) flat sample with a size of 52×11×1.2 mm was grit blasted and vapor phase coated in the same condition as in the above-mentioned Example 1.

Figure 6B:
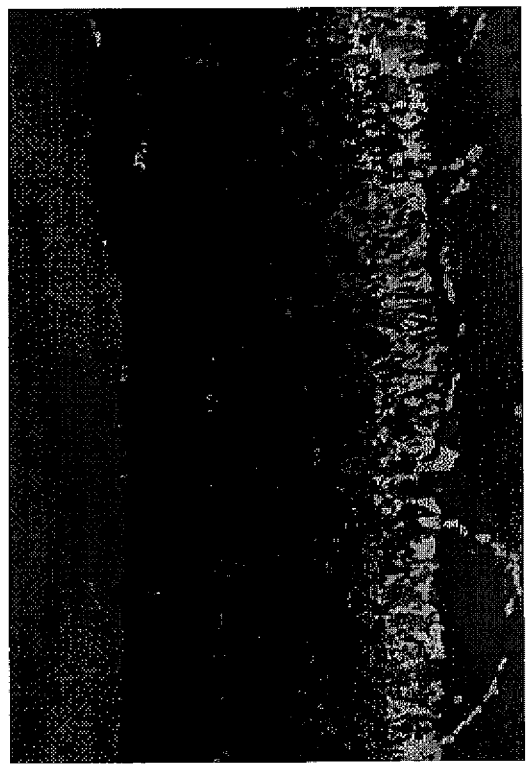
FIGS. 6A, 6B and 6C are surface, cross-sectional images, GDMS results of Hf-modified aluminide coatings on a HS-188 Co-base superalloy flat sample.
Figure 6A:
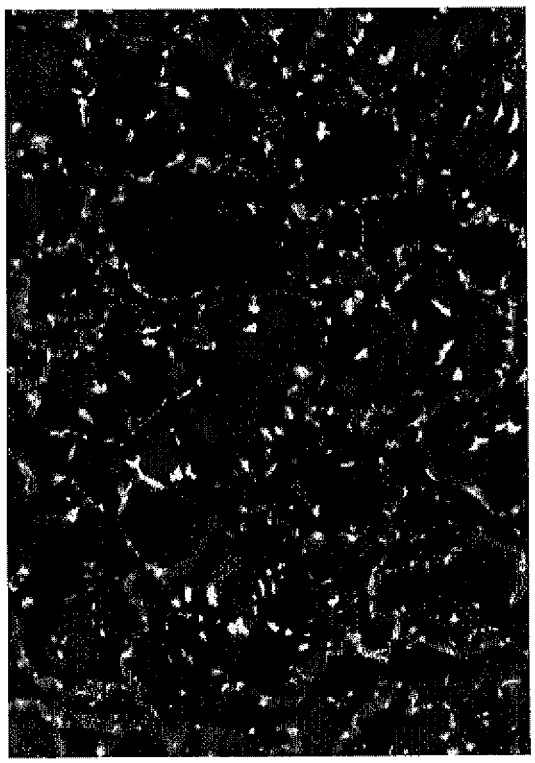
Figure 6C:
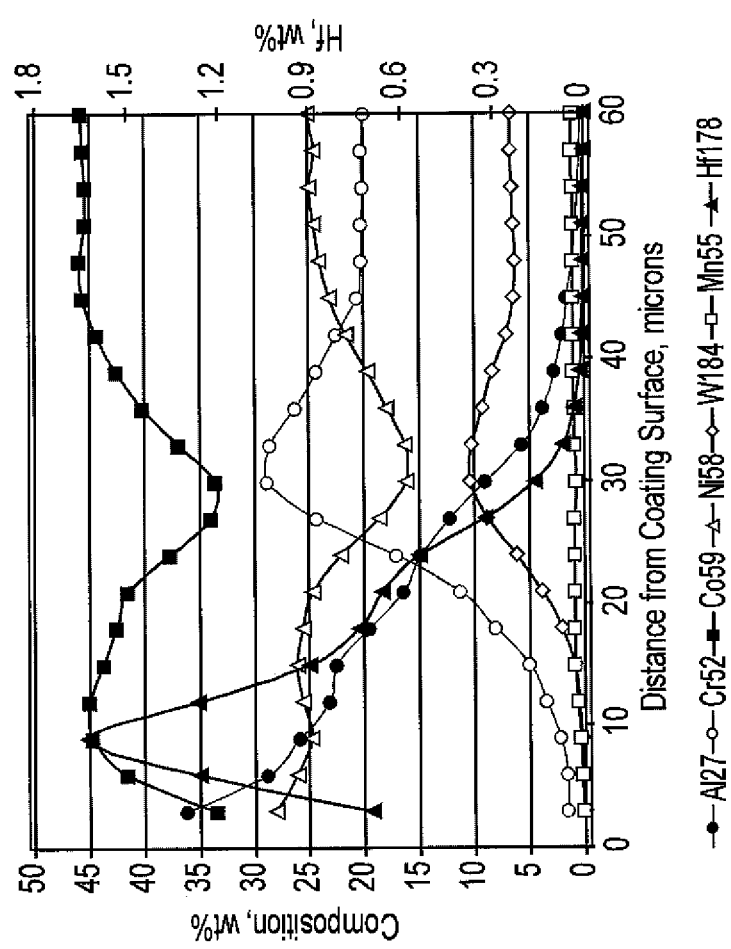

The sample surface morphology, cross-section microstructure, and GDMS composition profile along the coating depth are shown in FIGS. 6A, 6B and 6C, respectively. The developed coatings showed white Hf-rich phases at the coating surface and in the coatings. GDMS spectrum of the sample also showed Hf incorporation.

EXAMPLE 4

Scrap turbine engine components were coated with Hf-modified aluminide coatings to show the industrial applications. The components were three Ni-base superalloy turbine engine components (INCONEL 738 alloy turbine vanes, CMSX-3 single crystal turbine blades, and MarM 247 turbine vane segments) and one Co-base superalloy engine component (MarM 509 turbine vane segments). The components were grit blasted and vapor phase coated in the same condition as in the above-mentioned Example 1.

Figure 7:
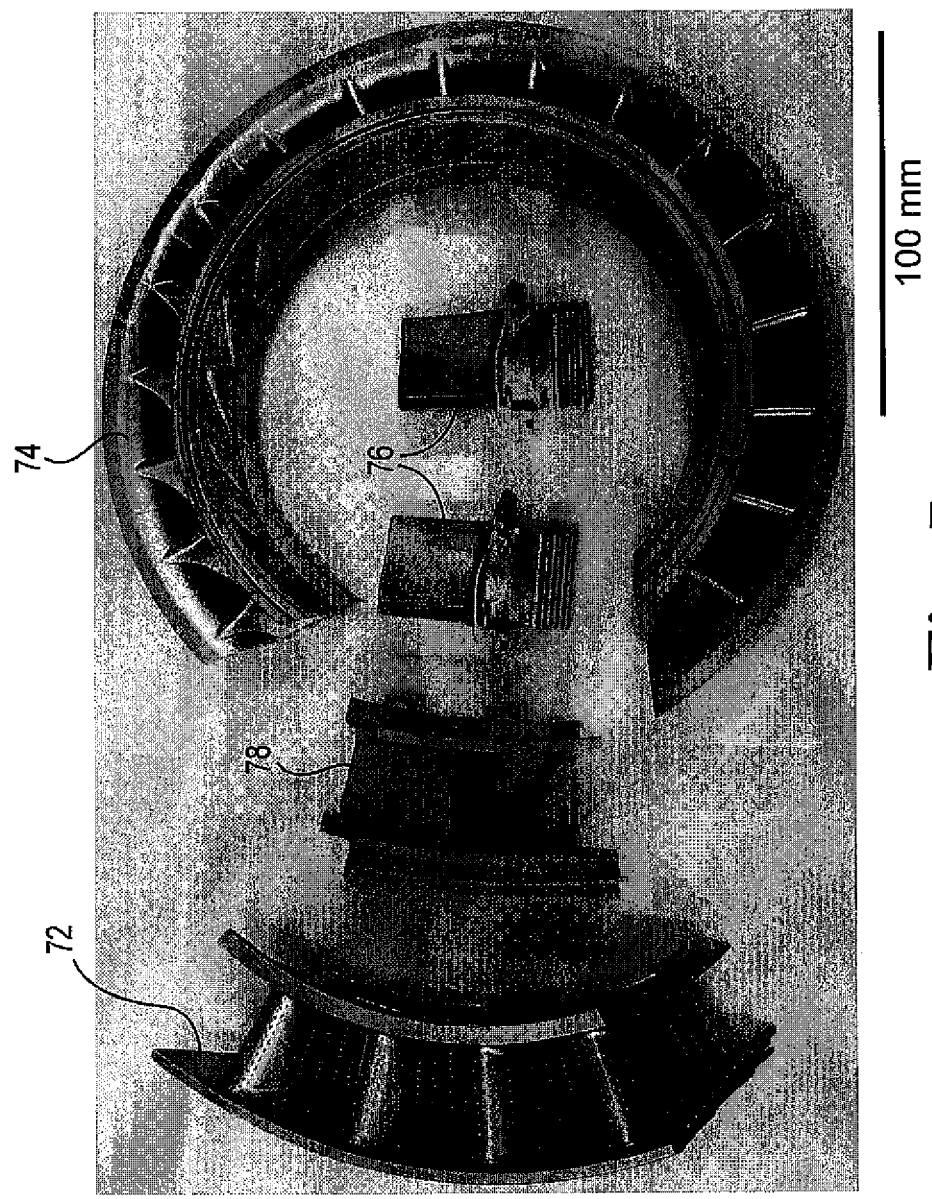
FIG. 7 is a picture of turbine engine components with the invented Hf-modified aluminide coatings.
Figure 8A:
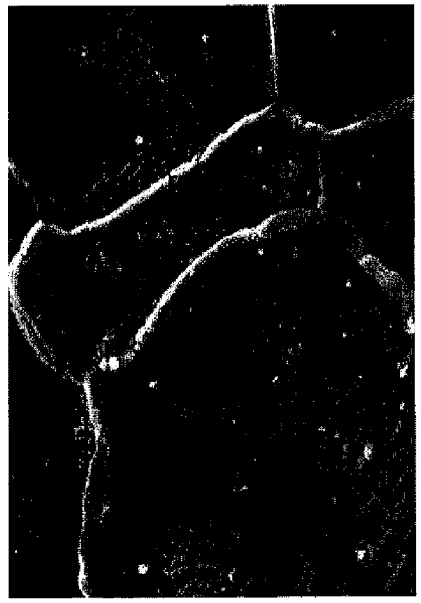
FIGS. 8A, 8B, 8C and 8D are surface morphology images of the MarM 247 substrate turbine vanes, INCONEL 738 turbine vanes, CMSX-3 turbine blades, and MarM 509 turbine vanes with the invented Hf-modified aluminide coatings, respectively.
Figure 8B:
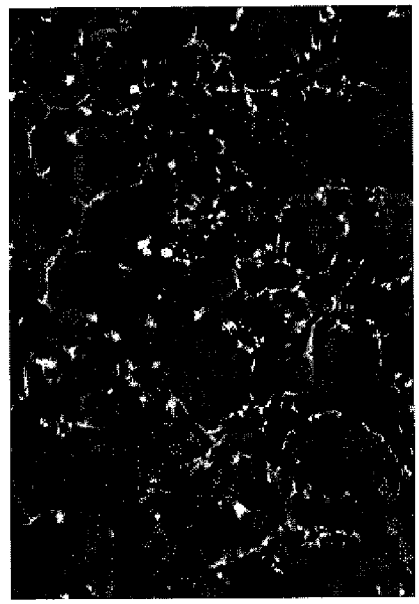
Figure 8C:
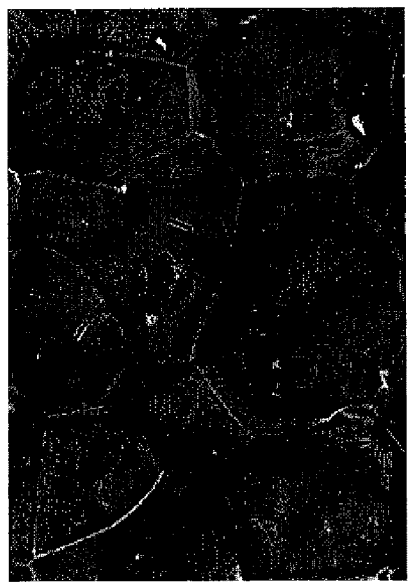
Figure 8D:
Figures 10A, 10B:
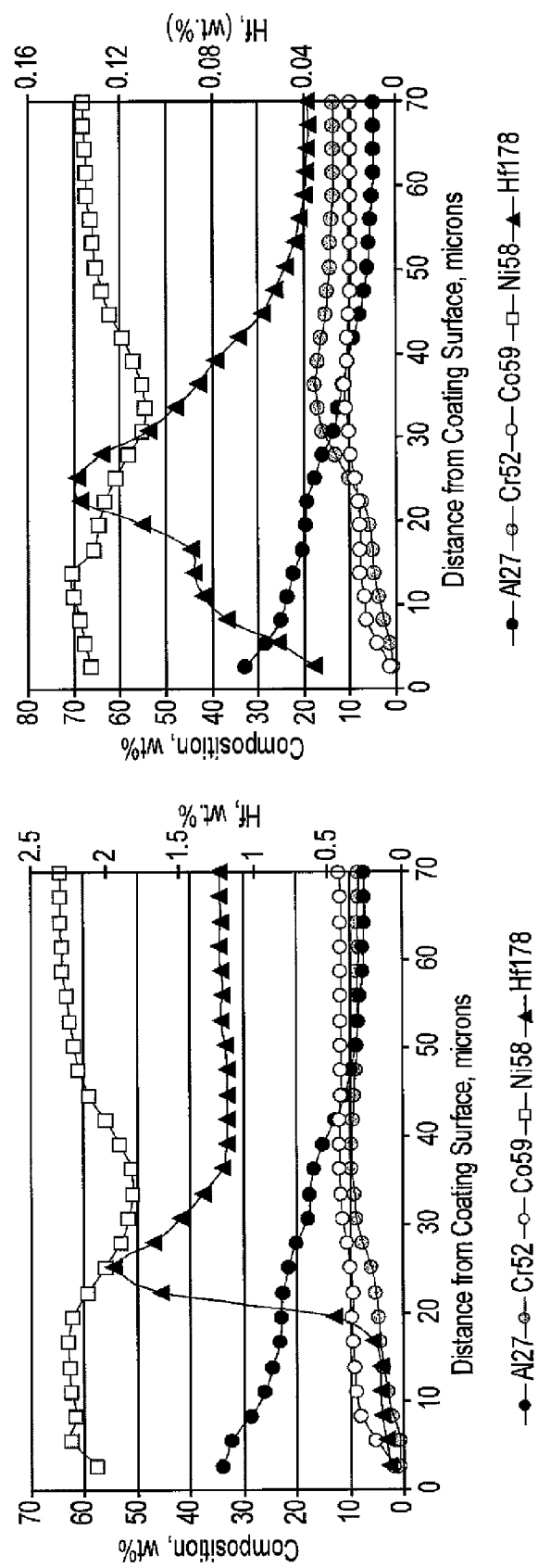
FIGS. 10A, 10B, 10C and 10D are GDMS results of the MarM 247 substrate turbine vanes, INCONEL 738 turbine vanes, CMSX-3 turbine blades, and MarM 509 turbine vanes with the invented Hf-modified aluminide coatings, respectively.
Figure 10D:
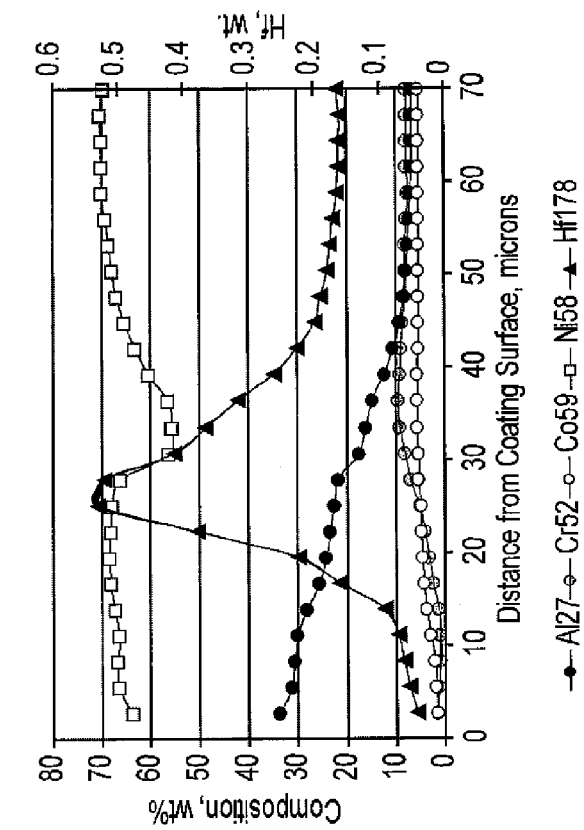
Figure 10C:
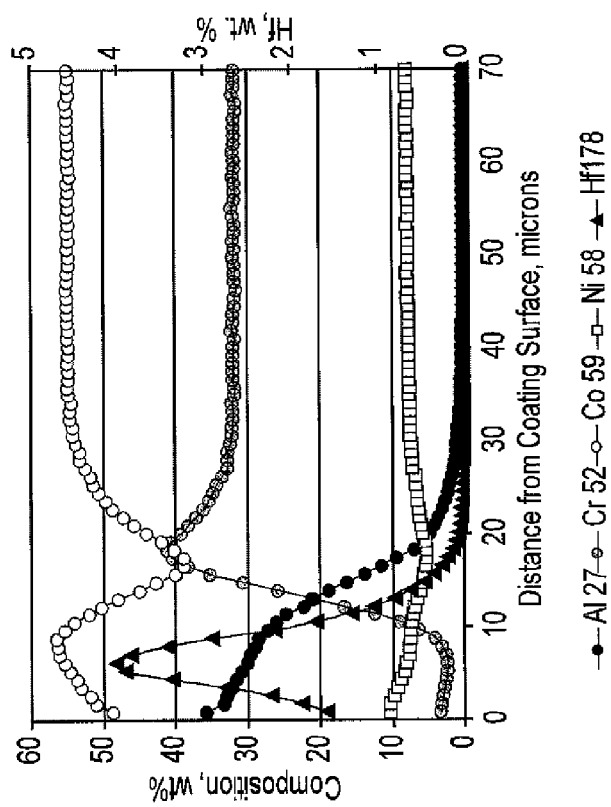

The associated components showed a shiny coating surface, as shown in FIG. 7. Component 72 is the MarM 247 turbine vane segments, component 74 is the INCONEL 738 turbine vanes, components 76 are the CMSX-3 turbine blades, and component 78 is the MarM 509 turbine vane segments. Surface morphology examination of the coated components indicated a polycrystalline structure, as shown in FIG. 8A for the MarM 247 turbine vane segments, in FIG. 8B for the INCONEL 738 turbine vanes, in FIG. 8C for the CMSX-3 turbine blades, and in FIG. 8D for the MarM 509 turbine vane segments. Similarly, the cross-section microstructure of the coatings on all coated components showed fine, precipitated Hf-rich phases in the $\beta$-(Ni, Co)Al phase matrix, as shown in shown in FIG. 9A for the MarM 247 turbine vane segments, in FIG. 9B for the INCONEL 738 turbine vanes, in FIG. 9C for the CMSX-3 turbine blades, and in FIG. 9D for the MarM 509 turbine vane segments. GDMS spectra of the developed coatings indicate Hf-incorporation, as shown in FIG. 10A for the MarM 247 turbine vane segments, in FIG. 10B for the INCONEL 738 turbine vanes, in FIG. 10C for the CMSX-3 turbine blades, and in FIG. 10D for the MarM 509 turbine vane segments.

In each of the above-mentioned examples, Hf incorporation into $\beta$-NiAl or $\beta$-(Ni,Pt)Al diffusion coatings was clearly evident in the compositional profiles obtained using GDMS method. The successful incorporation of Hf into simple aluminide or Pt-modified aluminide coatings via a vapor phase coating process was significant, as it shows that Hf addition is not only obvious to improve the properties of the diffusion coatings on turbine engine components, but also is feasible by using the invented industrial vapor phase coating process.

A number of embodiments of the invention have been described. Nevertheless, it will be understood that various modifications may be made without departing from the spirit and scope of the invention. Accordingly, other embodiments are within the scope of the following claims.

What is claimed is:

1. A method of coating an article, comprising the steps of:
   a) providing the article, said article having a metallic surface;
   b) providing a reactive element source, wherein at least 25 weight percent of the reactive element source is an oxide of Hf;
   c) providing an aluminum source, and wherein the reactive element source and the aluminum source are used in amounts such that reactive element source is from 1 to 30 weight percent of the aluminum source;
   d) providing a halide activator; and
   e) heating the article, reactive element source, aluminum source, and halide activator under conditions effective to cause vapor species comprising aluminum and the oxide of Hf to be co-deposited onto said metallic surface to form an aluminide coating.

2. The method of claim 1, wherein the metallic surface comprises a metal alloy, an intermetallic composition, a pure metal, or a combination of these.

3. The method of claim 1, wherein the metallic surface comprises a nickel-base alloy, a cobalt-base alloy, Ti-base alloy, or combinations of these.

4. The method of claim 1, wherein the metallic surface comprises a superalloy.

5. The method of claim 1, wherein heating of at least the article occurs in a non-oxidizing atmosphere.

6. The method of claim 1, wherein the article is out of physical contact with at least one of the sources and the halide activator during the heating step.

7. The method of claim 1, wherein the halide activator comprises a halide salt.

8. The method of claim 1, wherein the halide activator is selected from the group consisting of $AlF_3$, $AlCl_3$, $NH_4F$, $NH_4Cl$, NaF, NaCl, KF, KCl, and combinations of these.

9. The method of claim 8, wherein the heating occurs in a chamber having a volume, and the amount of activator provided is sufficient to provide 0.4 to 2.4 moles of the halide activator per cubic foot of the chamber volume.

10. The method of claim 1, wherein the aluminum source comprises aluminum and at least one other constituent selected from Cr, Co, Ni, Fe, Mo, W, Mn, Ti, Y, Zr, Pt, Hf, combinations of these, wherein the aluminum source comprises from about 3 to about 99 weight percent of aluminum based on the total weight of the aluminum source.

11. The method of claim 1, wherein the heating occurs in a chamber having a volume and the chamber contains from about 0.3 kg to about 7 kg of the aluminum source per cubic foot of container volume.

12. The method of claim 1, wherein the sources and the halide activator are in the form of particles and steps (b) through (d) comprise incorporating the particles into a mixture.

13. The method of claim 1, wherein the step (b) comprises providing from about 3 weight percent to about 10 weight percent of the reactive element source based on the total weight of the aluminum source.

14. The method of claim 1, wherein the heating step occurs at a temperature in the range from about 900° C. to about 1150° C.

15. The method of claim 1, wherein the heating occurs for a time period of about two minutes to about ten hours.

16. The method of claim 2, wherein the metallic surface of the article comprises a platinum-containing layer.

17. The method of claim 1, wherein the metallic surface of the article comprises Ni-based alloy comprising Ni and Co.

18. The method of claim 1, wherein the aluminide coating comprises an outward growth portion and an interdiffusion zone, and wherein the aluminide coating comprises 0.05 to 0.5 weight percent of one or more reactive elements in 1 to 10 test volumes at least 1 cubic micron in size in at least a selected depth in at least one of the outward growth portion or the interdiffusion zone.

* * * * *